(12) United States Patent
DelZoppo et al.

(10) Patent No.: US 8,793,151 B2
(45) Date of Patent: Jul. 29, 2014

(54) SYSTEM AND METHOD FOR ORGANIZATIONAL RISK ANALYSIS AND REPORTING BY MAPPING DETECTED RISK PATTERNS ONTO A RISK ONTOLOGY

(75) Inventors: Robert J. DelZoppo, Cicero, NY (US); Eric Brown, Sherrill, NY (US); Matthew Sweeney, Baldwinsville, NY (US)

(73) Assignee: SRC, Inc., North Syracuse, NY (US)

( * ) Notice: Subject to any disclaimer, the term of this patent is extended or adjusted under 35 U.S.C. 154(b) by 694 days.

(21) Appl. No.: 12/549,843

(22) Filed: Aug. 28, 2009

(65) Prior Publication Data
US 2011/0054961 A1    Mar. 3, 2011

(51) Int. Cl.
G06Q 10/00    (2012.01)
G06Q 10/06    (2012.01)

(52) U.S. Cl.
CPC .................................. G06Q 10/0635 (2013.01)
USPC ........................................................ 705/7.28

(58) Field of Classification Search
CPC ................................................ G06Q 10/0635
USPC ........................................................ 705/7.28
See application file for complete search history.

(56) References Cited

U.S. PATENT DOCUMENTS

| | | | | |
|---|---|---|---|---|
| 6,219,805 B1 * | 4/2001 | Jones et al. | ............... | 714/38.1 |
| 7,330,822 B1 * | 2/2008 | Robson et al. | ............... | 705/7.15 |
| 7,370,359 B2 * | 5/2008 | Hrabik et al. | ............... | 726/23 |
| 7,454,499 B2 * | 11/2008 | Cantrell et al. | ............... | 709/225 |
| 7,523,053 B2 * | 4/2009 | Pudhukottai et al. | ............ | 705/30 |
| 7,530,105 B2 * | 5/2009 | Gilbert et al. | ................... | 726/22 |
| 7,593,859 B1 * | 9/2009 | Owens et al. | ................ | 705/7.28 |
| 7,698,148 B2 * | 4/2010 | Lavu et al. | ..................... | 705/1.1 |
| 7,752,125 B1 * | 7/2010 | Kothari et al. | .................. | 705/38 |
| 7,979,298 B2 * | 7/2011 | Cheng et al. | ................. | 705/7.28 |
| 8,041,647 B2 * | 10/2011 | Clater | ............................ | 705/301 |
| 8,186,713 B2 * | 5/2012 | Fischer et al. | ................ | 280/739 |
| 8,561,189 B2 * | 10/2013 | Goranson et al. | ............... | 726/23 |
| 8,645,263 B1 * | 2/2014 | Seel et al. | ........................ | 705/38 |
| 2003/0004783 A1 * | 1/2003 | Calderaro et al. | ............. | 705/10 |
| 2003/0115133 A1 * | 6/2003 | Bian | ............................. | 705/38 |
| 2003/0120589 A1 * | 6/2003 | Williams et al. | ................ | 705/38 |
| 2004/0015375 A1 * | 1/2004 | Cogliandro | ....................... | 705/7 |
| 2004/0044617 A1 * | 3/2004 | Lu | ................................... | 705/38 |
| 2004/0054563 A1 * | 3/2004 | Douglas | ............................ | 705/7 |
| 2004/0059589 A1 * | 3/2004 | Moore et al. | ....................... | 705/1 |
| 2005/0021360 A1 * | 1/2005 | Miller et al. | ...................... | 705/1 |
| 2005/0066195 A1 * | 3/2005 | Jones | ............................. | 713/201 |

(Continued)

OTHER PUBLICATIONS

Enterpirse Risk Management—An Analytic Approach Tillinghat-Towers Perrin, Jan. 2000.*

(Continued)

*Primary Examiner* — Scott L. Jarrett
(74) *Attorney, Agent, or Firm* — George R. McGuire; Blaine T. Bettinger; Bond Schoeneck & King, PLLC

(57) ABSTRACT

A method for characterizing risk using an adaptive risk analysis engine. Following a user request for a risk analysis, online and/or offline factual information is retrieved by the engine and is used to produce risk indicators. The risk indicators are mapped onto risk ontology to produce risk factors which are then used to assess the level of risk. Parameters for the likelihood, impact, and external threat of the risk are calculated, and a risk assessment report is produced for the user.

23 Claims, 4 Drawing Sheets

(56) References Cited

U.S. PATENT DOCUMENTS

| | | | |
|---|---|---|---|
| 2005/0071266 A1* | 3/2005 | Eder | 705/38 |
| 2005/0119961 A1* | 6/2005 | Tanzillo et al. | 705/36 |
| 2005/0197952 A1* | 9/2005 | Shea et al. | 705/38 |
| 2006/0047561 A1* | 3/2006 | Bolton | 705/10 |
| 2006/0100958 A1* | 5/2006 | Cheng et al. | 705/38 |
| 2007/0101432 A1* | 5/2007 | Carpenter | 726/25 |
| 2007/0226796 A1* | 9/2007 | Gilbert et al. | 726/22 |
| 2007/0239496 A1* | 10/2007 | Supatgiat et al. | 705/7 |
| 2007/0250932 A1* | 10/2007 | Kothari | 726/25 |
| 2007/0255583 A1* | 11/2007 | Dreimann et al. | 705/1 |
| 2008/0077474 A1* | 3/2008 | Dumas et al. | 705/10 |
| 2008/0082380 A1* | 4/2008 | Stephenson | 705/7 |
| 2008/0262981 A1* | 10/2008 | Supatgiat et al. | 705/500 |
| 2008/0288330 A1* | 11/2008 | Hildebrand et al. | 705/10 |
| 2009/0030751 A1* | 1/2009 | Barve et al. | 705/7 |
| 2009/0228316 A1* | 9/2009 | Foley et al. | 705/7 |
| 2009/0276257 A1* | 11/2009 | Draper et al. | 705/7 |
| 2009/0319420 A1* | 12/2009 | Sanchez et al. | 705/38 |
| 2011/0167011 A1* | 7/2011 | Paltenghe et al. | 705/320 |

OTHER PUBLICATIONS

King, Jack L., Operational Risk—Measurement and Modeling Wiley Finance, 2001.*

Cuske, Christian, JontoRisk: An Ontology-Based Platform for Knowledge Based Simulation Modeling in Financial Risk Management, European Simulation and Modeling Conference, 2005.*

Kollaritis, Stefan, et al., MONITOR: an ontological basis for risk management Jan. 23, 2009.*

Simmonds, Andrew et al., An Ontology for Network Security Attackes Lecture Notes in Computer Science, pub. Springer, vol. 3285 / 2004, pp. 317-323, ISBN 3-540-23659-7.*

Makki, Jawad, et al., An NLP-based Ontology Population for Risk Management Generic Structure ACM, CSTST'08, Oct. 27-31, 2008.*

Atkinson, Colin et al., Concepts for an Ontology-centric Technology Risk Management Architecture in the Banking Industry IEEE, 10$^{th}$ IEEE International Enterprise Distributed Object Computing Conference Workshops, EDOCW'06, 2006.*

Juliusz L. Kulikowski. The Role of Ontological Models in Pattern Recognition. In Proceedings of CORES'2005.*

Ahmed, Mansoor et al., Toward and Ontology-based Organizational Risk Assessment in Collaborative Environments Using the SemanticLIFE, The Second International Conference on Availability Reliability and Seurity, ARES07, 2007, IEEE.*

Robin, C.R. Rene et al., Design and Development of Ontology for Risk Management in Software Project Management 2009 International Symposium on Computing, Communication and Control, ISCCC, 2009.*

Ware, Bryan S. et al., A Risk-Based Decision Support System for Antiterrorism Aug. 2002.*

Allan, G.M. et al., Risk Mining for Strategic Decision Making Advances in Intelligent Web, ASC, 2007.*

Aleksy, Markus et al., A Distributed Simulation Environment for Simulation Modeling in Operational Risk Management IEEE, International Conference on Complex, Intelligent and Software Intensive Systems, 2008.*

Bishop, Matt et al., AZALIA: an A to Z Assessment of the Likelihood of Insider Attack IEEE International Conference on Technologies for Homeland Security, May 2009.*

Greitzer, Frank L. et al., Predictive Modeling for Insider Threat Mitigation Pacific Northwest National Laboratory, Apr. 2009.*

ArcSight Solution Brief: Addressing Insider Threats ArcSight Inc., 2006.*

Magklaras, Georgios V., An Architecture for Insider Miuse Threat Prediction in IT Systems University of Plymouth, Jan. 2005.*

Stonebuner, Gary et al., Risk Management Guide for Information Technology Systems National Institute of Standards and Technology, Jul. 2002.*

Carley, Kathleen M. et al., ORA: Organization Risk Analyzer Carnegie Mellon, Center for Computational Analysis of Social and Organizational Systems, Jan. 2004.*

Ulieru, Michaela et al., Adaptive Risk Management System (ARMS) for Critical Infrastructure Protection Integrated Computer Aided Engineering, IOS Press, vol. 13, No. 1, 2006.*

* cited by examiner

SYSTEM AND METHOD FOR ORGANIZATIONAL RISK ANALYSIS AND REPORTING BY MAPPING DETECTED RISK PATTERNS ONTO A RISK ONTOLOGY

STATEMENT REGARDING FEDERALLY SPONSORED RESEARCH OR DEVELOPMENT

This invention was made with government support under the contracting authority of the Department of the Interior (DOI), contract number NBCHC030136. The government has certain rights in the invention.

BACKGROUND OF THE INVENTION

1. Field of the Invention

The present invention relates to a risk analysis engine, and, more particularly, to an adaptable risk analysis engine capable of representing and executing organizational risk policies through input and analysis of both online and offline data sources.

2. Description of the Related Art

Businesses are constantly under attack by entities both inside and outside the walls of the business. With the expanding worldwide interconnectivity of people and entities fueled by technological advances such as the Internet and handheld electronic devices, there are increased opportunities for attack. These attacks are increasingly more dangerous as attackers gain the technology and the proficiency to overwhelm or bypass a businesses' security measures.

These attacks pose significant risks to employees and business entities, where risk is defined as the combination of the probability of an event occurring and the potential impact of that event. The impact associated with a risk can be either positive or negative. The events for which risk is determined can come from many different sources. Internet or intranet hackers continually scan for exploitable vulnerabilities in security software, productivity software, or email software and launch targeted or Internet-wide attacks either directly or through distributable malware such as spyware, crimeware, trojans, viruses, or worms. Terrorists, both domestic and international, pose physical, financial, and electronic threats to the operation of a business. Competitors looking to develop an advantage over the business can steal valuable information.

A businesses' own employees can pose some of the greatest threats to the organization, in part because of the enormous potential impact of the employee's actions. Employees who are poorly trained or negligent can pose a threat to the business by inadvertently disrupting or destroying assets, allowing unauthorized access, or distributing proprietary information or malware. Dishonest, disgruntled, or terminated employees can pose more direct and dangerous threats including assault, bribery, blackmail, theft, sabotage, disruption or destruction of company assets, unauthorized access, or the intentional distribution of malware or proprietary information.

To reduce the risk of these threats to an acceptable or manageable level, businesses commonly implement risk management systems that continually monitor the activities of the business' employees as well as the activities of the business as a whole. Risk management systems perform risk analysis to identify and characterize threats, and then assess the qualitative or quantitative magnitude of the risk as a function of the possibility of the threat occurring and the predicted harm that would occur as a result of that occurrence. Although previous risk management systems monitor business activities and produce risk assessments, no risk assessment system utilizes a risk analysis method similar to the present invention.

SUMMARY OF THE INVENTION

It is therefore a principal object and advantage of the present invention to provide an adaptable framework for organizational risk analysis.

It is a further object and advantage of the present invention to represent and execute complex risk policies through input and analysis of a wide variety of both online and offline sources.

It is yet another object and advantage of the present invention to provide a method for producing a risk model that includes information about threats, the likelihood parameters of the risk, and the impact parameters of the risk.

Other objects and advantages of the present invention will in part be obvious, and in part appear hereinafter.

In accordance with the foregoing objects and advantages, the present invention provides a method for analyzing risk using an adaptive risk analysis engine, the method comprising: (a) requesting a risk analysis; (b) retrieving factual information; (c) producing risk indicators using patterns detected in the factual information; (d) determining risk indicator patterns and mapping said risk indicator patterns onto risk ontology to produce risk factors; (e) assessing level of risk based on the risk factors; (f) constructing impact and external threat parameters; and (g) producing a risk assessment report.

Yet another embodiment of the present invention is an adaptive risk analysis computer system comprising: (a) a computer with an interface to request a risk analysis and receive the result of the request; (b) a risk broker, said risk broker in communication with a fact analyzer and a risk analyzer; (c) a risk knowledge-base in communication with the risk broker, said risk knowledge-base containing a risk policy; and (d) a threat environment database in communication with the risk analyzer.

BRIEF DESCRIPTION OF THE DRAWINGS

The present invention will be more fully understood and appreciated by reading the following Detailed Description of the Invention in conjunction with the accompanying drawings, in which.

DETAILED DESCRIPTION OF THE INVENTION

Figure 1:
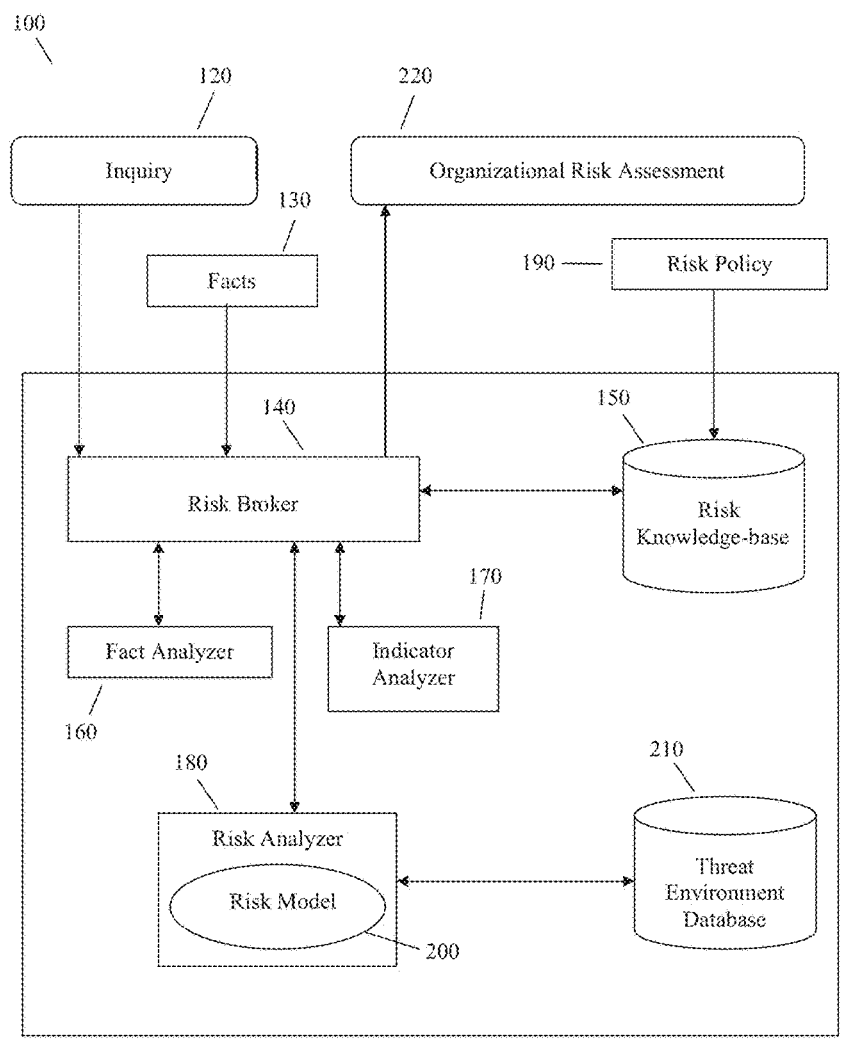
FIG. 1 is a system diagram of an embodiment of the present invention.

Referring now to the drawings wherein like reference numerals designate identical or corresponding parts throughout the several views, there is shown in FIG. 1 a system diagram of an embodiment of the present invention. The Adaptive Risk Analysis Engine ("ARAE") 100 is a reasoning engine that is adaptable to the risk policy of an organization where the scope of the policy is the risk behavior indicators of human subjects. The engine is based on an information-brokering paradigm to effectively synthesize information over time as new facts enter the system such that the engine can be used on-demand or as a continuous monitor. As a result, the ARAE is capable of representing and executing complex risk policies through input and analysis of information.

To create an organizational risk assessment 220, a request 120 is introduced into the Adaptive Risk Analysis Engine ("ARAE") 100. The request can be a continuous system-wide monitoring demand on the ARAE, a user request for a risk assessment of a particular employee or other potential threat, or some other request for analysis. Thus, depending on the application that uses the ARAE, the engine can be used in a continuously monitoring mode or to produce risk analysis information on-demand.

Data enters the system as factual information ("facts") 130 which originate from both online and offline monitoring sources. Online sources include any public or subscription-based databases that contain information about potential threats, including employees. This includes but is not limited to criminal records, driving abstracts, credit reports, background checks, and financial records. Other online sources of information include malware monitoring services which provide up-to-the-minute assessments of malware attacks and threats around the world, or services that provide information about potential localized terrorist threats. Offline sources of facts include text files, user-provided inputs, or other information. The information ranges from simple assertions about an individual such as the fact that Employee X printed sensitive document Y, to complex information about Employee X's troubled credit history. Facts alone do not indicate risk; it is the analysis of the factual information which results in the risk assessment of the organization.

The kernel of the ARAE is the Risk Broker 140, which handles the request and control functions of the risk analysis process. Risk Broker 140 communicates directly with the Risk Knowledge-base 150 and with each analysis component: the Fact Analyzer 160, the Indicator Analyzer 170, and the Risk Analyzer 180.

Risk Knowledge-base ("RKB") 150 is designed to adapt to an organization's risk policy without requiring major reprogramming efforts. The RKB uses an ontological approach to map Risk Policy 190 onto categories of risk and precursor patterns which indicate risk. In addition to the ontology, the RKB uses a rule-based strategy to represent knowledge of risk patterns. The rule-based strategy is used to consult the ontology and assert conclusions in the overall risk analysis at run-time. This approach allows the system to be modified dynamically without code rewrites, making it highly adaptable to changing security polices and different applications. The ontology can be called on at any time during the risk analysis. Risk Broker 140 consults the ontology to service requests and uses publish-subscribe communication, resulting in flexibility to use the ontology in an on-demand situation.

Risk Policy 190 is the policy of threats, dangers, or other concerns faced by the business, as defined by the organization. A risk policy is defined as a set of business rules, R, such that for each rule, r, the result of applying each r∈R to the evidence base, E, results in some new risk knowledge, k∈K. The risk knowledge base is the set of mappings from categories of risk assigned to patterns of evidence e∈E. The risk policy is related to the organization risk knowledge base, K, in that it defines the logic for deducing higher order risk from known evidence (facts, indicators, concerns). Since the risk policy is extrinsically defined, it is modified without reprogramming the risk assessment system. FIG. 5 is an example of a risk policy rule.

Fact Analyzer 160 implements a specialized set of rules, FR, for detecting patterns in the raw facts from online and offline fact sources. The Fact Analyzer rules scan the detected patterns to deduce first-order evidence in the analysis, which are called risk indicators. The following equation describes how new evidence, E' is derived from the raw fact data, F:

$$E' = \bigcup_{f_i \in FR}^{n} AnalyzeFacts(f_i, E)$$

This first-order evidence can be a singular fact or an induction based upon input facts.

Risk Broker 140 feeds the risk indicators into Indicator Analyzer 170. The Indicator Analyzer implements a specialized set of rules, IR, which deduce the second-order evidence from the risk indicators. The second-order evidence is characterized by patterns which map onto the risk ontology. The deduction of second-order evidence is defined as:

$$E' = \bigcup_{i_i \in IR}^{n} AnalyzeIndicators(i_i, E)$$

At this level of reasoning, the system also produces the exacerbating or mitigating conditions pertaining to indicator patterns.

Risk Analyzer 180 has the ultimate responsibility of combining the risk indicators along with the exacerbating or mitigating conditions, M, to assess the level of risk for a given potential threat, such as an employee. The Risk Analyzer creates a final risk assessment by combining likelihood (L), impact (I), and knowledge of the external threat environment (T), defined as follows for each case, c:

Likelihood$(c,E)=L_c$

Impact$(c,TDB)=I_c$

ThreatEnvironment$(c,TDB)=T_c$

While the likelihood is computed by analysis of the data, facts, and indicators, the impact and external threat parameters are accessed from the Threat Environment Database 210, TDB, which is constructed using knowledge available in the organization.

Risk Analyzer 180 also computes the Risk Model 200, which is a representation of the entities, attributes and relationships that are used to describe risk and to compute risk, and risk factors. The Risk Model provides a robust, multi-dimensional model of risk for the organization. Dimensions used in the risk model include organization, roles, individuals, data access models, external threat interests, insider vulnerabilities, time, risk-level, and risk parameters such as likelihood, impact and threat. The model for calculating risk is defined as follows:

Risk$(c_i)=L_c \times I_c \times T_c$

The Risk Model is itself adaptable, allowing the technology to tailor the computation for organizations.

The Organizational Risk Assessment 220 is a report to the user that contains information about the risk of a particular potential threat or information about business-wide risks. Organizational Risk Assessment 220 can be a risk analysis at the organization level, sub-organization level for a target population, or at the individual level, depending on the needs of the user.

In one embodiment of the present invention, Risk Assessment 220 is communicated to a user within the organization.

The Risk Assessment can be displayed to the user on a computer screen or other form of media. Additionally, a computer printer can print the Risk Assessment for delivery to the user. The Risk Assessment can also be emailed or otherwise electronically transmitted to the user, including wireless transmission systems.

In a second embodiment of the present invention, Risk Assessment 220 is used by another application within the organization. The information can be used by a separate application that alerts a user to the Risk Assessment, or uses the information to attempt to mitigate the impact of the event. For example, the login privileges of an employee can be quickly interrupted if the Risk Assessment determines that the employee's actions constitute significant risk.

Figure 2:
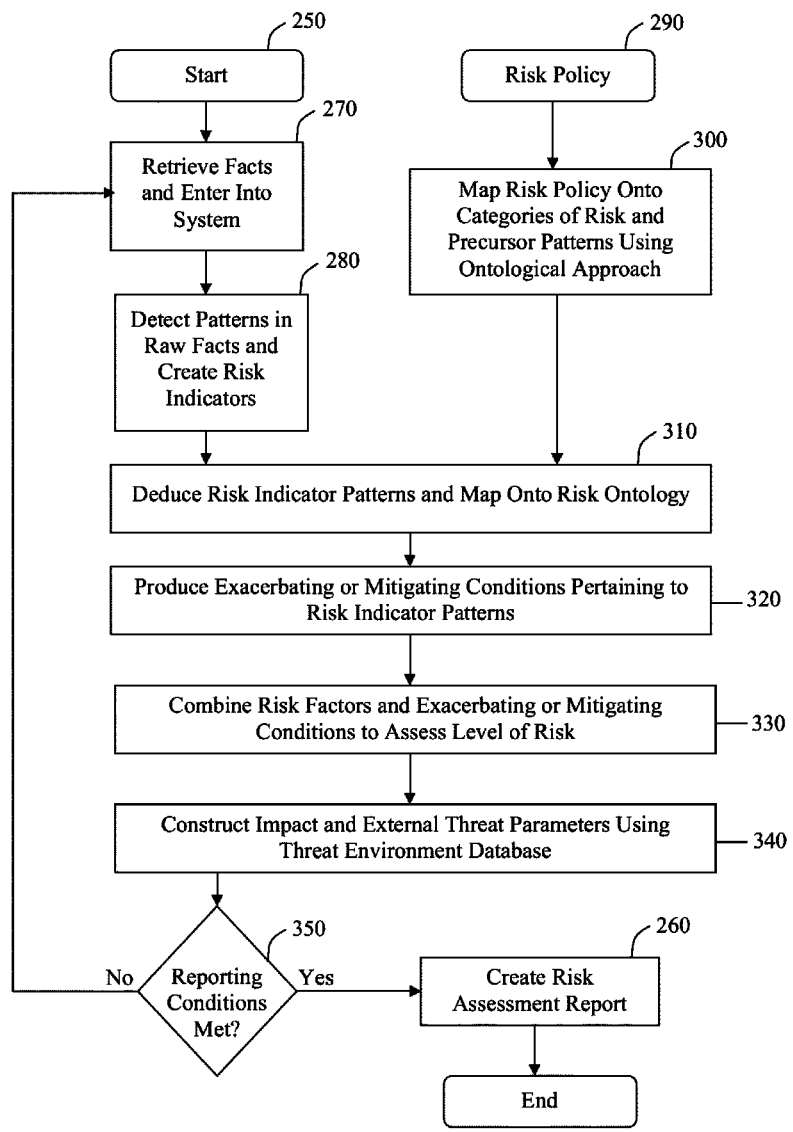
FIG. 2 is a schematic representation of a risk management method according to the present invention.

FIG. 2 is a schematic representation of a risk management method according to the present invention. Processing begins with an inquiry 250 for a risk assessment report 260. A fact retrieval process 270 retrieves facts from the online or offline sources discussed above either continuously, on-demand, or according to predetermined parameters.

A fact analysis process 280 may use one of several methods to detect patterns in raw facts extracted from data collected by observation and monitoring. This process uses methods that include, but are not limited to, template-based, rule-based, and statistically-based approaches. FIG. 6 is a set of example facts. Process 280 then scans the detected patterns to deduce first-order evidence called risk indicators.

The system utilizes the organization's risk policy 290, an outline of the extent and types of risks that the organization is willing to take to meet its current or projected goals. Since the ARAE uses a rule-based strategy to represent knowledge of risk patterns, the engine can be modified dynamically without code rewrites. As a result, changes to the organization's risk policy do not necessitate drastic changes to the system's code.

Before the engine is used to analyze risk or following an update of the organization's risk policy, the system's ontology process 300 uses an ontological approach to map the risk policy onto categories of risk and precursor patterns which indicate risk patterns.

The indicator analysis process 310 uses a rule-based approach to deduce second-order evidence from the risk indicators. This evidence is characterized by patterns which map onto the risk ontology. Since the engine uses a publish-subscribe communication process, the ontology can be called on at any point during the risk analysis.

At 320, the system produces any exacerbating or mitigating conditions pertaining to indicator patterns. A risk analysis process 330 combines the risk indicators with these exacerbating or mitigating conditions in order to assess the level of risk for a given inquiry or potential threat.

Using the information from step 330, the engine then constructs both impact and external threat parameters using information from the threat environment database at 340. With the level of risk and the threat and impact analyzed, the engine can then create a Risk Assessment Report 260 for the user.

In one embodiment of the current invention, the engine can be used to constantly monitor at an organizational, sub-organizational, or individual level. The engine can be set to create a Risk Assessment Report only if the level of risk or the threat and/or impact meets pre-determined reporting conditions. Thus, at step 350, the engine compares the analysis to the reporting conditions to determine whether to create a Report. If the reporting conditions are not met, then the engine can begin another round of analysis. If the reporting conditions are met, then the engine can prepare a Report for the user. System reporting parameters used to determine the reporting conditions include threshold, info available, and time. These parameters support continuous monitoring as well as on-demand reporting and visualization of risk according to the ARAE system.

Figure 3:
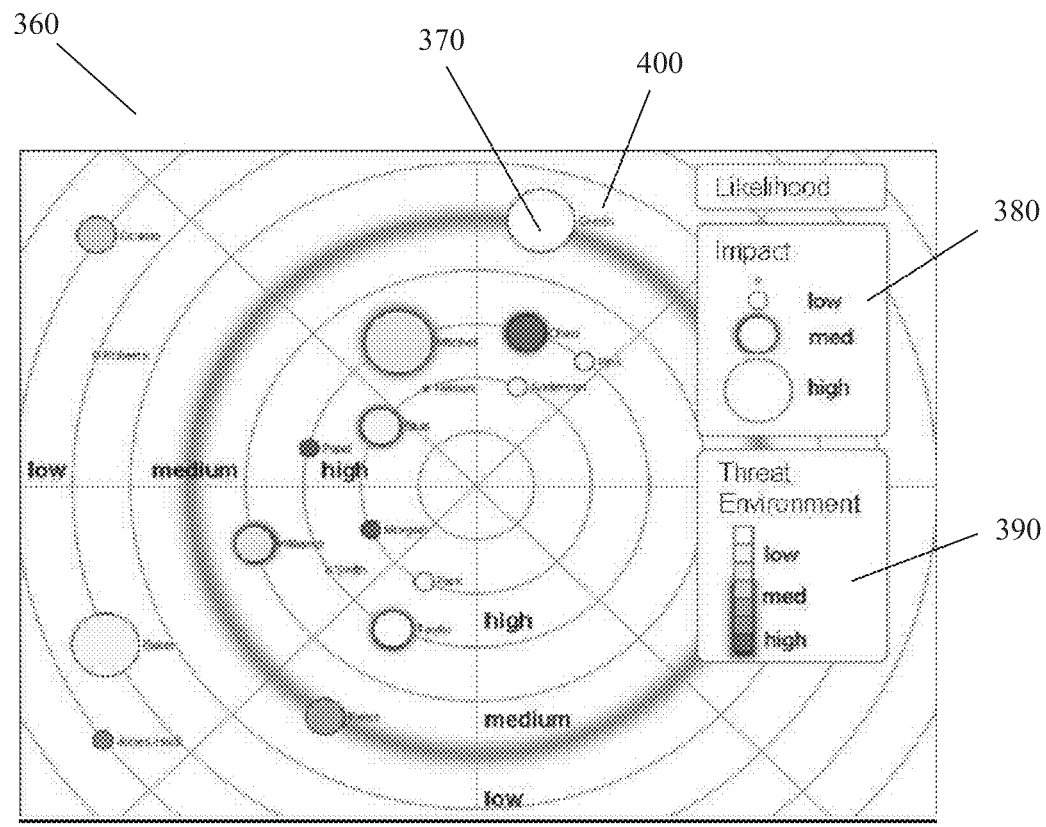
FIG. 3 is an example organizational risk assessment according to one embodiment of the present invention.

FIG. 3 is an example of an Organizational Risk Assessment Report 360 according to the present invention. In this embodiment, the results are mapped onto a three-dimensional grid. Each node, shown as a circle 370 in FIG. 3, represents a single individual within the population of individuals selected for analysis by user-determined parameters. The population can include every member of an organization or a subgroup of individuals within the organization. Each node is optionally associated with the name 400 or other identifier of the individual that the node represents.

Each node is mapped onto the grid using the likelihood that an associated risk will occur. The axis of the grid ranges from the lowest likelihood at the outer edges of the grid to the highest likelihood at the innermost central point of the grid. The location of the node along this axis indicates the likelihood of risk associated with that node.

In addition to location on the grid, each node contains at least two characteristics that convey information about risk associated with that node. First, each node conveys information about impact, the amount of damage that could be caused by the risk associated with that node. Potential impact 380 is represented by the variable size of the node on the grid, with the smallest node size indicating the smallest potential impact and the largest node size indicating the largest potential impact. Second, each node conveys information about the threat environment 390 associated with that node. On the grid, the node's exposure to one or more threat environments is represented by the color of the node. A lighter node indicates low exposure to threat environment and a darker color indicates high exposure to threat environment.

Figure 4:
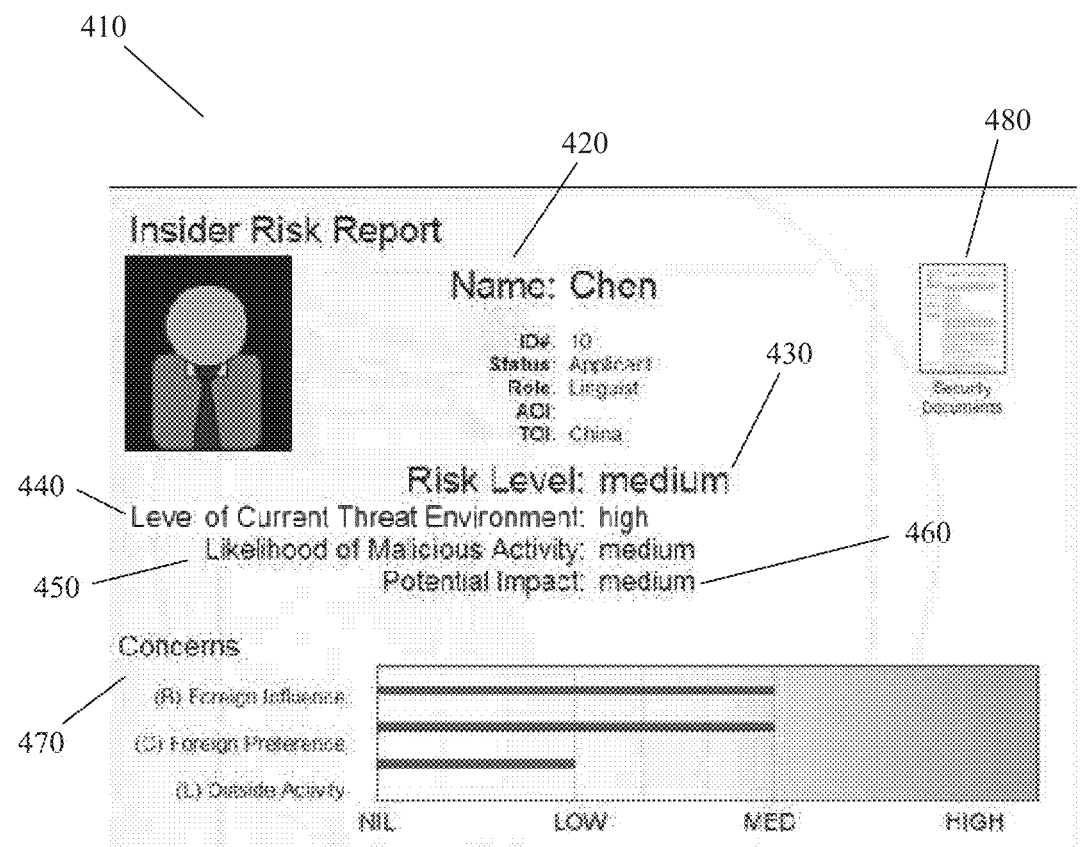
FIG. 4 is an example individual risk assessment according to one embodiment of the present invention.

FIG. 4 is an example of an Individual Risk Assessment 410 according to one embodiment of the present invention. The individual detail report includes any personal data 420 that might be relevant to the risk determination. Report 410 also includes information about the overall level of risk 430, the level of the current threat environment 440, the likelihood of malicious activity 450 by the individual, and the potential impact 460. The report information is supported by concern categories 470 and security documents 480, both of which could include identified facts and source data.

Although the present invention has been described in connection with a preferred embodiment, it should be understood that modifications, alterations, and additions can be made to the invention without departing from the scope of the invention as defined by the claims.

What is claimed is:

1. A computer-implemented method for analyzing risk at an individual or at an organizational level using an adaptive risk analysis engine, the method comprising:

receiving a request for a risk analysis;

retrieving factual information about both human and machine behavior from at least one online source and at least one offline source, said sources comprising at least one database source and at least one unstructured source;

detecting, using a processor running the adaptive risk analysis engine, a pattern in said retrieved factual information;

producing via induction a risk indicator from said detected pattern;

determining, using the adaptive risk analysis engine, a risk indicator pattern from the produced risk indicator, wherein the adaptive risk analysis engine uses a risk policy defining threats faced by an organization to determine a risk to be asserted and at least one factor that mitigates or exacerbates the asserted risk;

mapping, using the adaptive risk analysis engine, said risk indicator pattern and produce a risk factor, wherein the adaptive risk analysis engine dynamically consults a risk ontology;

assessing a level of risk based on the risk factor;

constructing impact, internal threat, and external threat parameters; and determining, based upon said threat parameters, whether reporting conditions have been met and when met producing a risk assessment report.

2. The method of claim 1, wherein the level of risk is assessed by combining a risk factor and an exacerbating or mitigating factor, the exacerbating or mitigating factor determined from the risk policy and produced by the risk analysis engine.

3. The method of claim 1, wherein the adaptive risk analysis engine calculates the likelihood and impact of a risk.

4. The method of claim 1, wherein the risk ontology is created by mapping a risk policy onto risk patterns and categories of risk.

5. The method of claim 4, wherein the risk policy is defined as the policy of threats or dangers faced by an organization.

6. The method of claim 4, wherein the risk policy is interactively defined.

7. The method of claim 1, wherein the adaptive risk analysis engine produces a risk model, the risk model providing a multi-dimensional model of risk and comprising: (i) a vulnerability assessment relative to a human threat vector and a machine threat vector, (ii) a threat environment assessment based on at least one external threat factor and a threat environment relative to human resources within an organization, and (iii) an impact assessment representing a resultant effect upon the organization should the threat vector be realized.

8. The method of claim 1, wherein the risk analysis is at a organizational level, a sub-organizational level, or an individual level.

9. The method of claim 1, wherein the adaptive risk analysis engine analyzes risk only after receiving the request.

10. The method of claim 1, wherein the adaptive risk analysis engine continuously analyzes risk.

11. The method of claim 1, wherein the risk analysis engine is modified dynamically to incorporate a change in the risk policy, without a code rewrite.

12. The method of claim 1, wherein the risk assessment report is communicated to another application.

13. The method of claim 1, wherein the risk assessment report is communicated to a user.

14. An adaptive risk analysis computer system comprising:
a computer with an interface;
a risk broker, said risk broker in communication with the computer and with a fact analyzer and a plurality of risk analyzers;
a risk knowledge-base in communication with the risk broker, said risk knowledge-base containing a risk policy, said risk policy defining threats faced by an organization comprising a risk ontology and a plurality of rules for accessing and navigating said risk ontology;
a threat environment database in communication with the risk analyzer; and
factual information stored within a database, said factual information comprising both human and machine behavior extracted from at least one structured data source and at least one unstructured data source, said database in communication with said risk broker;
wherein the fact analyzer detects a pattern in the factual information stored within said database and produces a risk indicator via induction from the detected pattern to determine a risk to be asserted and at least one factor that mitigates or exacerbates the asserted risk, and further wherein the risk analyzer determines a risk indicator pattern from the risk indicator, maps the risk indicator pattern onto a risk ontology to produce a risk factor by dynamically consulting the risk ontology, assesses a level of risk based on the risk factor, constructs impact, internal threat, and external threat parameters, determines whether reporting conditions have been met based upon said threat parameters, and produces a risk assessment report when said reporting conditions have been met.

15. The system of claim 14, further comprising a computer display, said display allowing the user to visualize risk at an individual or an organizational level.

16. The system of claim 14, further comprising means for printing a risk assessment.

17. The system of claim 14, further comprising mean for electronically transmitting a risk assessment to a user.

18. The method of claim 4, wherein said risk policy defines at least one precursor pattern of malicious activity, at least one historical pattern of malicious activity, and at least one ongoing malicious behavior, and further wherein the risk pattern contained in the risk policy comprises at least one precursor human behavior that presents risk resulting from an internal or external threat to organizational security.

19. The method of claim 1, further comprising the steps of:
mitigating a risk indicator as it is extracted from a data source by maintaining a mitigation database, said mitigation database comprising a plurality of mitigating facts and information about the impact of mitigating facts upon the validity or severity of a fact instance;
applying a mitigating indicator against the mitigation database as a new risk indicator is introduced; and
matching the mitigating indicator to a subject under evaluation for risk.

20. The method of claim 1, further comprising the steps of:
exacerbating a risk indicator as it is extracted from a data source by maintaining an exacerbation database, said exacerbation database comprising a plurality of exacerbating facts and information about the impact of an exacerbating fact upon the validity or severity of a fact instance;
applying an exacerbating indicator against the exacerbation database as a new risk indicator is introduced; and
matching the exacerbating indicator to a subject under evaluation for risk.

21. The method of claim 1, wherein the step of retrieving factual information comprises the steps of:
receiving data from at least one unstructured textual source and at least one structured data source, said sources representing at least one human behavior and at least one interaction for a particular human subject;
dynamically determining that information in documents that is relevant to said human a subject; and
applying an analysis of at least one mitigating indicator and at least one exacerbating indicator to said determined factual information.

22. The method of claim 1, wherein the step of detecting a pattern in said factual information comprises the steps of:
evaluating a rule in a knowledge representation framework capable of forward and backward inference;
evaluating a relationship between factual information based on the fact ontology and the risk policy;

matching each instance of factual information as it occurs;

enhancing factual information with a mitigating or a exacerbating criteria that elevates or decreases, respectively, the influence of factual information in the risk assessment; and continuously and dynamically evaluating the relationships between facts as each fact is received.

23. The system of claim 14, further comprising:

means for providing machine-automated and human-contributed feedback on a component of the risk assessment; and capturing, using said feedback, additional information regarding validity of an extracted fact instance, the utility of a risk indicator induction, and a contribution of a risk indicator to a risk pattern.

\* \* \* \* \*